(12) United States Patent
Huang

(10) Patent No.: US 11,536,377 B1
(45) Date of Patent: Dec. 27, 2022

(54) GATE VALVE CAPABLE OF BEING OPENED AND CLOSED BY USING ELASTIC FORCE

(71) Applicant: KING LAI HYGIENIC MATERIALS CO., LTD., Zhubei (TW)

(72) Inventor: Shu-Mei Huang, Zhubei (TW)

(73) Assignee: KING LAI HYGIENIC MATERIALS CO., LTD., Zhubei (TW)

( * ) Notice: Subject to any disclaimer, the term of this patent is extended or adjusted under 35 U.S.C. 154(b) by 0 days.

(21) Appl. No.: 17/666,925

(22) Filed: Feb. 8, 2022

(30) Foreign Application Priority Data

Jan. 5, 2022 (TW) .................................. 111100346

(51) Int. Cl.
*F16K 3/18* (2006.01)
*F16K 3/314* (2006.01)
*F16K 3/316* (2006.01)
*F16K 3/02* (2006.01)

(52) U.S. Cl.
CPC .............. *F16K 3/184* (2013.01); *F16K 3/029* (2013.01); *F16K 3/0281* (2013.01); *F16K 3/18* (2013.01); *F16K 3/314* (2013.01); *F16K 3/3165* (2013.01)

(58) Field of Classification Search
CPC . F16K 3/184; F16K 3/18; F16K 3/314; F16K 3/3165; F16K 3/0281; F16K 51/02; F16K 3/029
See application file for complete search history.

(56) References Cited

U.S. PATENT DOCUMENTS

| 4,052,036 | A | * | 10/1977 | Schertler | ................. F16K 51/02 251/197 |
| 4,480,659 | A | * | 11/1984 | Peacock | ................. F16K 3/184 251/197 |
| 5,101,861 | A | | 4/1992 | Deville et al. | |
| 6,612,546 | B2 | * | 9/2003 | Young | ..................... F16K 3/184 251/158 |

(Continued)

FOREIGN PATENT DOCUMENTS

| CN | 203272833 U | 11/2013 |
| CN | 204267768 U | 4/2015 |

(Continued)

*Primary Examiner* — David Colon-Morales
(74) *Attorney, Agent, or Firm* — Muncy, Geissler, Olds & Lowe, P.C.

(57) ABSTRACT

A gate valve includes a valve body, a transmission base disposed in the valve body, and two gate plates disposed at two sides of the transmission base. The gate plates are connected together through an elastic member disposed in the transmission base. When the transmission base is located at a first position, the gate plates are received in a chamber and moved towards each other by the elastic member to open valve openings. When the transmission base is located at a second position, the valve openings are sealed by the gate plates, and an elastic positioning portion of the elastic member is abutted against a positioning plate of the valve body for providing a buffer positioning effect to the gate plates. Therefore, the gate valve of the present invention is opened and closed by using the elastic member, and has advantages of smooth movement, simple structure, and good adaptability.

6 Claims, 10 Drawing Sheets

(56) References Cited

U.S. PATENT DOCUMENTS

| | | | | |
|---|---|---|---|---|
| 9,638,335 B2 * | 5/2017 | Huang | ................. | F16K 27/044 |
| 10,738,895 B2 * | 8/2020 | Ehrne | .................... | F16K 3/029 |
| 2006/0169940 A1 | 8/2006 | Mayer et al. | | |

FOREIGN PATENT DOCUMENTS

| | | | | |
|---|---|---|---|---|
| CN | 107923554 A | | 4/2018 | |
| DE | 1945901 A1 | * | 9/1970 | |
| DE | 1945901 A1 | | 9/1970 | |
| DE | 3737755 A | * | 5/1989 | ............ F16K 3/184 |

\* cited by examiner

GATE VALVE CAPABLE OF BEING OPENED AND CLOSED BY USING ELASTIC FORCE

BACKGROUND OF THE INVENTION

1. Field of the Invention

The present invention relates to a gate valve and more particularly, to a gate valve that can be opened and closed by using an elastic force.

2. Description of the Related Art

In a vacuum valve disclosed by China Patent No. 107923554 A, when the roller support moves from the open position to the intermediate position, the first and second plates are carried together with the roller support, and when the roller support moves from the intermediate position to the closed position, the movements of the first and second plates are blocked in a movement direction, and the first and the second spreading rollers are moved along the rising edges of the depressions. Under this circummundane, the first and second plates are separated from each other along a spreading direction, wherein the first and second plates are pressed against the first and second spreading rollers through the first spring arm configured to the first plate and the second spring arm configured to the second plate.

In a dual closure gate valve disclosed by China Patent No. 204267768 U, when the sealing gate plate is closed, the driving shaft pushes continuously the driving frame, and the rolling bearings are moved from the deeper stop sections to the shallower inclined sections, such that the distance between the two sealing gate plates is increased. This causes that the sealing gate plates and the valve holes are kept sealed. On the contrary, when the driving shaft moves in the reverse direction, the rolling bearings are moved from the shallower inclined sections to the deeper stop sections. With the rebound force of the elastic member, the distance between the two sealing gate plates is decreased so as to eliminate the sealing relationship between the gate plates and the valve holes.

However, the aforesaid prior arts both have the problems of unsmooth movement of the gate plate, complicated components, and high manufacturing cost. Further, the aforesaid prior arts both have fixed sealing strength, so it is difficult to adjust the rebound force of the elastic member according to actual needs (such as different specifications and sizes), and therefore, the adaptability performance is relatively poor.

SUMMARY OF THE INVENTION

It is a primary objective of the present invention to provide a gate valve, which has advantages of smooth movement, simple structure, low manufacturing cost, and good adaptability.

To attain the above objective, the gate valve of the present invention comprises a valve body and a gate unit. The valve body has a chamber, a positioning plate, and two valve openings communicating with the chamber and located between the chamber and the positioning plate. The gate unit includes a transmission base, two gate plates, and at least one elastic member. The transmission base is disposed in the valve body and reciprocally moved between a first position and a second position relative to the valve body. The gate plates are disposed at two opposite sides of the transmission base and connected together through the elastic member, such that the gate plates are moved towards each other by an elastic force of the elastic member. The elastic member is mounted to the transmission base and has an elastic positioning portion protruding out of the transmission base. When the transmission base is located at the first position, the gate plates and the elastic member are received in the chamber of the valve body for allowing the valve openings of the valve body to be opened. When the transmission base is located at the second position, the valve openings of the valve body are sealed by the gate plates, and the elastic positioning portion of the elastic member is abutted against the positioning plate of the valve body for providing a buffer positioning effect to the gate plates.

It can be understood from the above illustration that the gate valve of the present invention can adjust a rebound force of the elastic member according to actual needs so as to have better adaptability. In addition, the gate plates provided by the present invention are moved smoothly to improve work efficiency, and because the whole component is relatively simple, the purpose of reducing manufacturing cost can be achieved.

Preferably, the elastic member is one in number. The elastic member further has two opposite elastic portions. One ends of the elastic portions are connected with the gate plates, and the other ends of the elastic portions are connected with the elastic positioning portion. As such, when the transmission plates are located at the first position, the elastic portions of the elastic member provide the rebound force to the gate plates. When the transmission plates are located at the second position, the elastic portions of the elastic member are pushed outwards by the gate plates to store the rebound force of the elastic member.

Preferably, the elastic portions each have a first arm section and a second arm section connected with the first arm section. One ends of the first arm sections are connected with the gate plates, and two ends of the second arm sections are connected with the first arm sections and the elastic positioning portion respectively. Further, widths of the first arm sections are greater than widths of the second arm sections, such that the same elastic portion has different elastic coefficients.

Preferably, two opposite sides of the transmission base each have a transmission protrusion. The second arm section of each of the elastic portions of the elastic member has an elongated hole adjacent to elastic positioning portion. The transmission protrusions of the transmission base are slidably inserted into the elongated holes of the elastic member. As such, when the transmission base is moved from the first position to the second position, the elastic member is driven by the transmission protrusions of the transmission base to move synchronously, and then the gate plates are driven by the elastic member to move synchronously.

Preferably, the elastic member is at least two in number. The elastic members each have two opposite elastic portions. One ends of the elastic portions of each of the elastic members are connected with the gate plates and the other ends of the elastic portions of each of the elastic members are connected with the elastic positioning portion. Further, lengths of the elastic portions of one elastic member are greater than lengths of the elastic portions of the other elastic member, such that elastic portions of the elastic members have different elastic coefficients.

Preferably, two opposite sides of the transmission base each have a transmission protrusion. One of the elastic members has an elongated hole adjacent to elastic positioning portion. The elongated holes of the elastic members are slidably sleeved on the transmission protrusions of the transmission base. As such, when the transmission base is moved from the first position to the second position, the elastic members are driven by the transmission protrusions of the transmission base to move synchronously, and then the gate plates are driven by the elastic members to move synchronously.

Preferably, the gate unit further includes two balls disposed at two opposite sides of the transmission base. Each of the gate plates has a rolling groove at one side towards the transmission base. The rolling grooves each have a first section and a second section connected with the first section. A depth of the first section is greater than a depth of the second section. As such, when the transmission base is moved from the first position to the second position, the balls are moved from the deeper first sections to the shallower second sections, such that the gate plates are pushed outwards by the balls to increase the distance between the gate plates, causing the valve openings to be sealed by the gate plates. On the contrary, when the transmission base is moved from the second position to the first position, the balls are moved from the shallower second sections to the deeper first sections, such that the balls release the push force applied to the gate plates. At this time, the gate plates are driven by the rebound force of the elastic member to eliminate the sealing relationship with the valve openings.

Preferably, a fluid pressure cylinder is provided in the valve body and has a driving shaft passing through the chamber and connected with the transmission base for driving the transmission base to reciprocally move between the first position and the second position.

Other advantages and features of the present invention will be fully understood by reference to the following specification in conjunction with the accompanying drawings, in which like reference signs denote like components of structure.

DETAILED DESCRIPTION OF THE INVENTION

Figure 1:
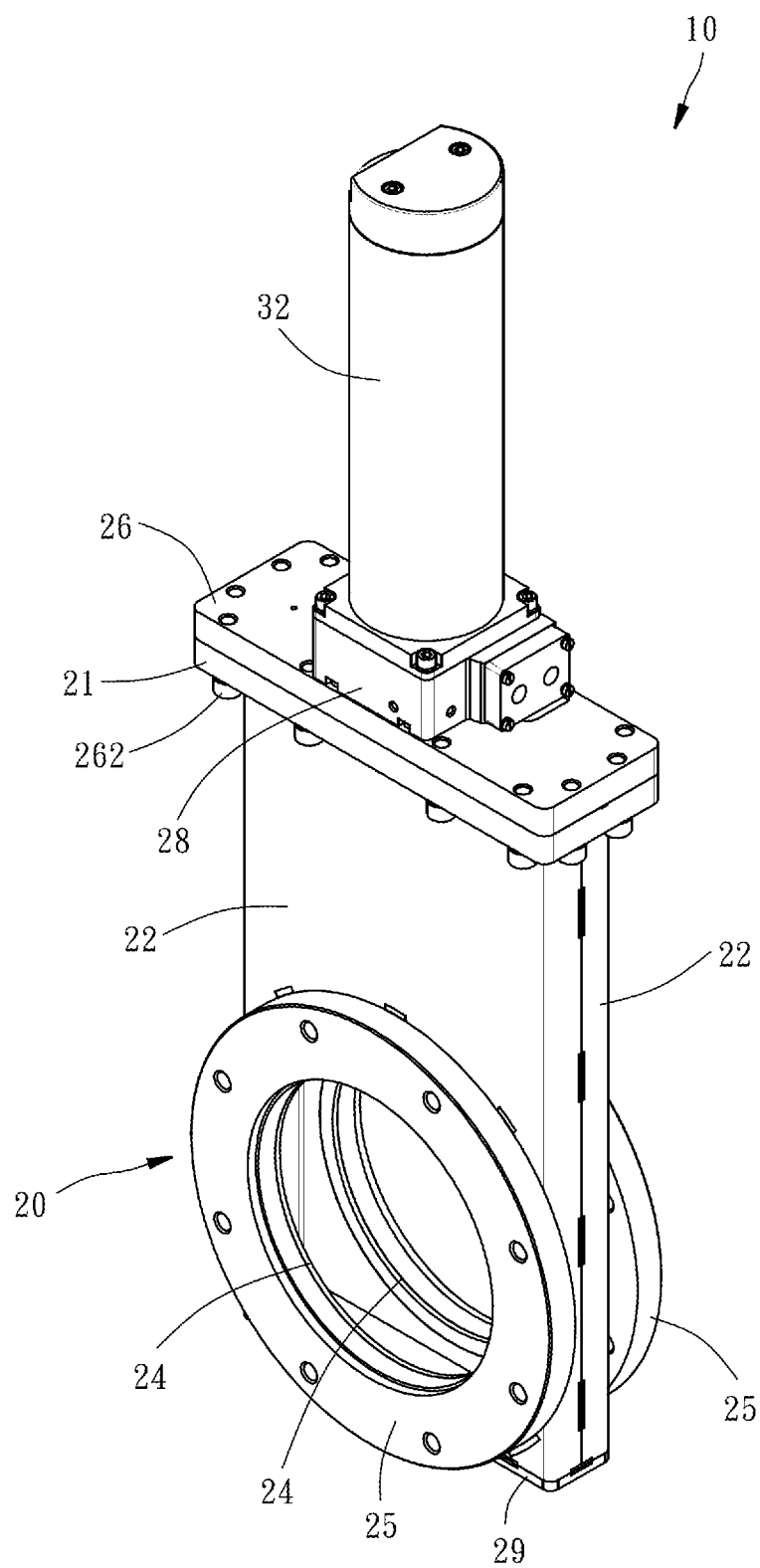
FIG. 1 is a perspective view of a gate valve according to a first embodiment of the present invention, showing the valve openings are opened.
Figure 2:
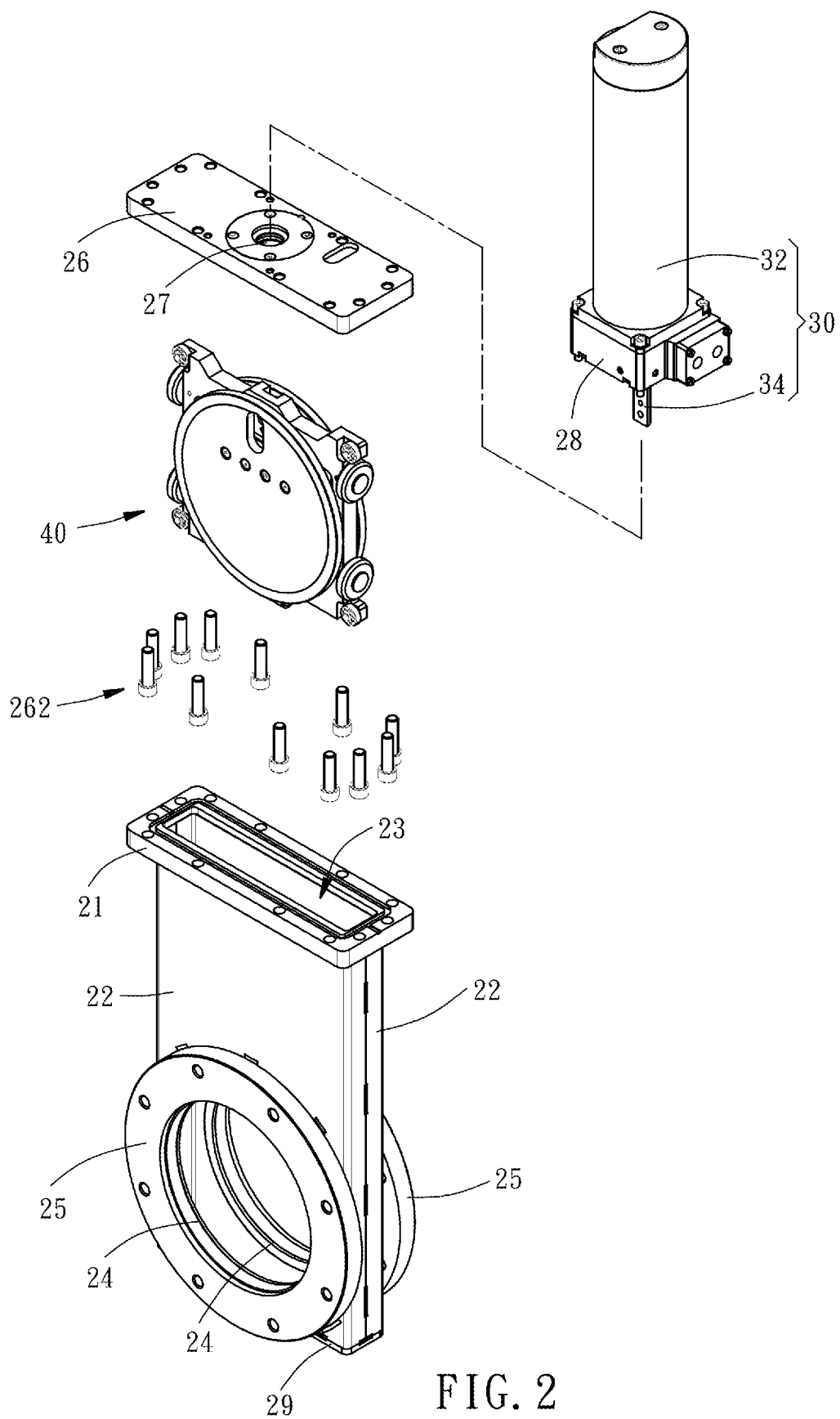
FIG. 2 is a partially exploded view of the gate valve according to the first embodiment of the present invention.
Figure 3:
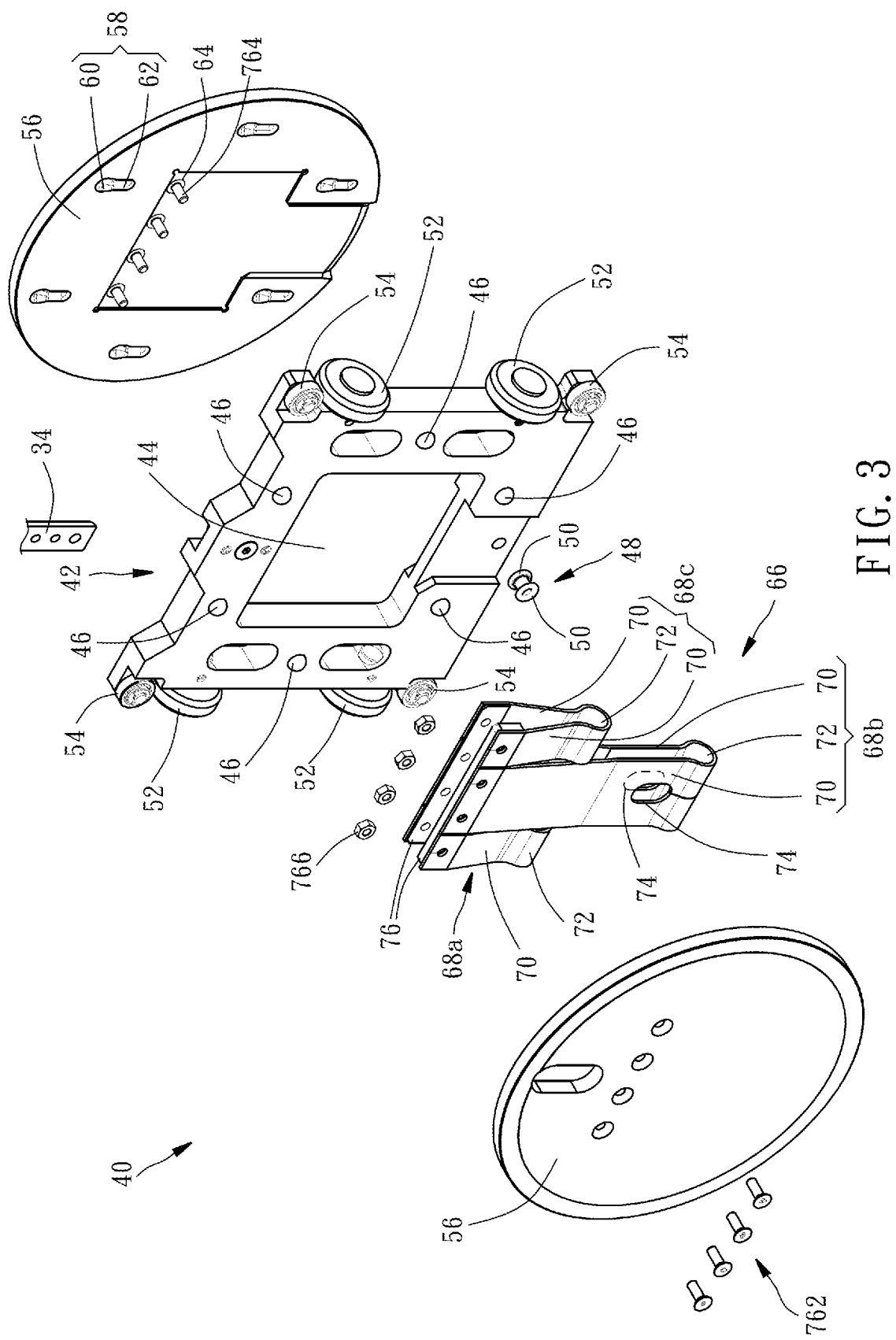
FIG. 3 is an exploded view of a gate unit provided by the gate valve according to the first embodiment of the present invention.

Referring to FIGS. 1 to 3, a gate valve 10 of the present invention comprises a valve body 20, a fluid pressure cylinder 30, and a gate unit 40.

As shown in FIGS. 1 and 2, the valve body 20 includes a top frame 21, two lateral plates 22, two annular plates 25, a top plate 26, a cylinder base 28, and a positioning plate 29. The top ends of the lateral plates 22 are assembled with the top frame 21 to form a hollow chamber 23 between the lateral plates 22 and the top frame 21. The bottom ends of the lateral plates 22 each have a valve opening 24 communicating with the chamber 23. The annular plates 25 are assembled with the outer surface of the lateral plates 22 and arranged around the valve openings 24. The top plate 26 is assembled with the top frame 21 by using a plurality of screws 262 for closing the top opening of the chamber 23. The middle of the top plate 26 has a shaft hole 27 communicating with the chamber 23. The cylinder base 28 is fixed to the top surface of the top plate 26 to seal the shaft hole 27 of the top plate 26. The positioning plate 29 is connected with the bottom end of the lateral plates 22 and adjacent to the valve openings 24, such that the valve openings 24 are located between the chamber 23 and the positioning plate 29.

Figure 6:
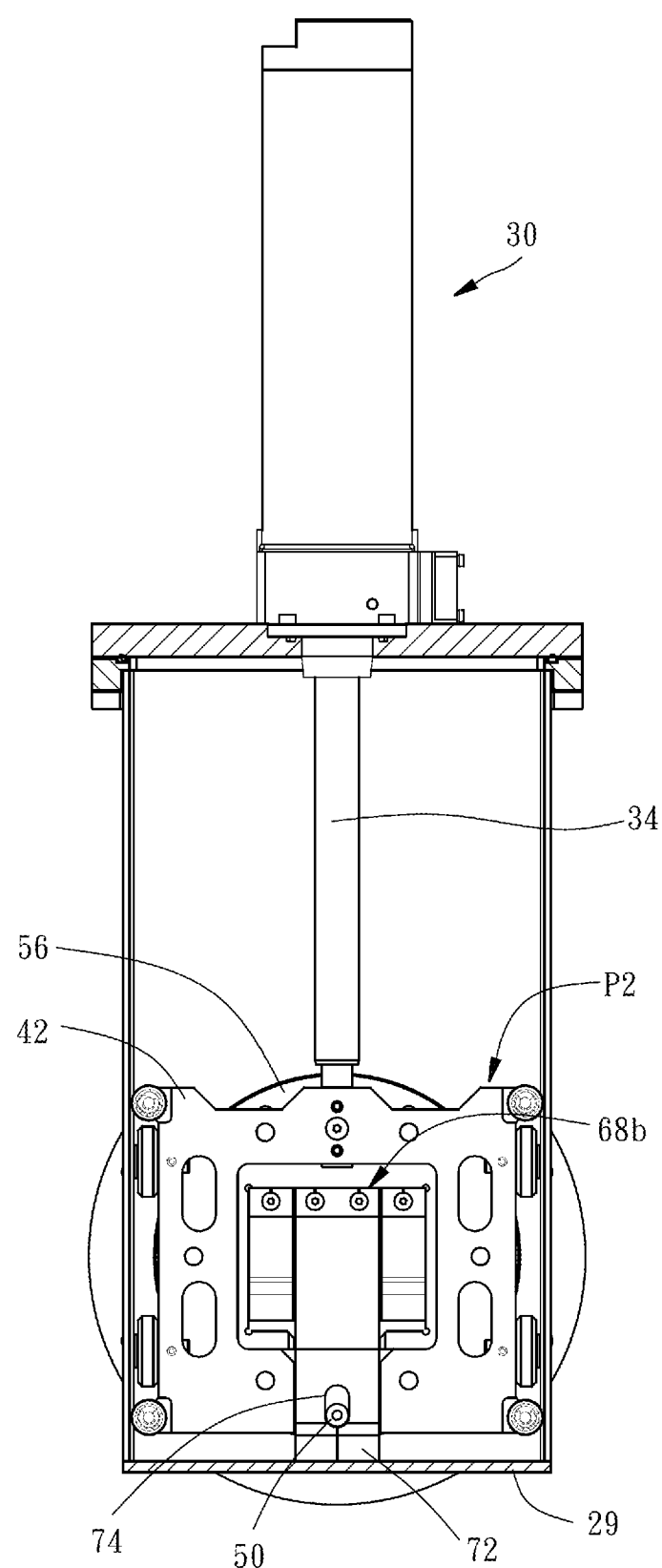
FIG. 6 is a partially sectional front view of the gate valve according to the first embodiment of the present invention, showing the transmission base is located at the second position.

The fluid pressure cylinder 30 can, but not limited to, be a pneumatic cylinder or hydraulic cylinder. The fluid pressure cylinder 30 includes a cylinder body 32 assembled with the top surface of the cylinder base 28, and a driving shaft 34 movably disposed upwards and downwards in the cylinder body 32 and penetrated in the chamber 23 through the shaft hole 27 of the top plate 26 (as shown in FIG. 6).

The gate unit 40 is disposed in the valve body 20 and includes a transmission base 42, two gate plates 56, and an elastic component 66, as shown in FIG. 3:

The transmission base 42 is a rectangular frame. The middle of the transmission base 42 has a hollow slot 44. A plurality of balls 46 (the number and the position of the balls 46 can be adjustable according to actual needs, and are not limited here) are provided at the front and rear sides of the transmission base 42 and arranged around the hollow slot 44. The top end of the transmission base 42 is connected with the bottom end of the driving shaft 34 of the fluid pressure cylinder 30, such that the transmission base 42 can be driven by the driving shaft 34 to reciprocally move upwards and downwards. The bottom end of the transmission base 42 is penetrated by a transmission member 48. Two ends of the transmission member 48 each have a transmission protrusion 50. The transmission protrusions 50 protrude out of the front and rear sides of the transmission base 42. Further, two up and down guide wheels 52 is configured to each of the left and right sides of the transmission base 42, and a bearing 54 is configured to each of the four corners of the transmission base 42. The wheels 52 and the bearings 54 are abutted against the lateral plates 22 of the valve body 20. By means of the arrangement of the wheels 52 and the bearings 54, the stability and smoothness of the upward and downward movement of the transmission base 42 can be enhanced.

Figure 4:
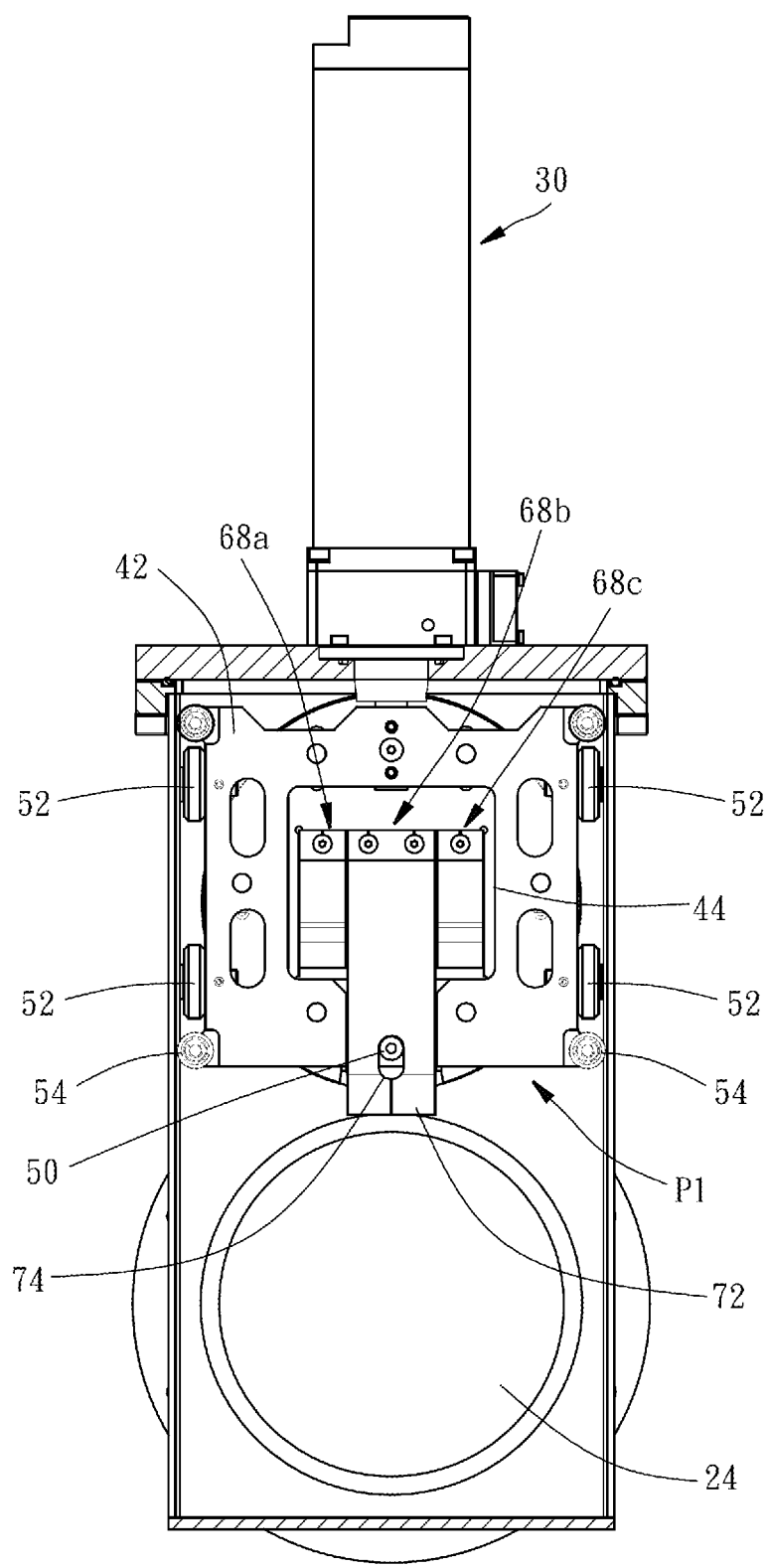
FIG. 4 is a partially sectional front view of the gate valve according to the first embodiment of the present invention, showing the transmission base is located at the first position.

The gate plates 56 is located at the front and rear sides of the transmission base 42. The gate plates 56 each have a rolling groove 58 located at one side towards the transmission base 42 and extending longitudinally. The rolling grooves 58 accommodate the balls 46 in a one-to-one manner. Each of the rolling grooves 58 has a first section 60 and a second section 62 connected with the bottom end of the first section 60. The depth of the first section 60 is greater than the depth of the second section 62 (as shown in FIGS. 4 and 6). What needs to be added here is that the number and the position of the rolling groove 58 can be adjustable according to actual needs as long as the rolling grooves 58 correspond to the balls 46.

The elastic component 66 includes threes elastic members 68a, 68b, 68c in this embodiment. The elastic members 68a, 68b, 68c each have two opposite elastic portions 70 and an elastic positioning portion 72 integrally connected with the bottom end of the elastic portions 70. The length of the middle elastic member 68b is greater than the lengths of the left and right elastic members 68a, 68c, such that the elastic members 68a, 68b, 68c have different elastic coefficients. Further, the bottom end of each of the elastic portions 70 of the middle elastic member 68b has an elongated hole 74 adjacent to the elastic positioning portion 72. The elastic component 66 further includes two support plates 76. One of the support plates 76 is fastened to the top end of one elastic portion 70 of the elastic members 68a, 68b, 68c and one of the gate plates 56 by using four screws 762. The other of the support plates 76 is fastened to the top end of the other elastic portion 70 of the elastic members 68a, 68b, 68c by using four screws 764 and four nuts 766. The heads of the screws 764 is fixed in four counterbores 64 of the other gate plate 56. By this way, the gate plates 56 are combined together through the elastic component 66. In addition, as shown in FIGS. 3 and 4, the elastic members 68a, 68b, 68c are sleeved on the transmission base 42 from bottom to up and each have a part received in the hollow slot 44. Further, the elastic positioning portion 72 of the middle elastic member 68b protrude out of the bottom of the transmission base 42, and the elongated holes 74 of the middle elastic member 68b are sleeved on the transmission protrusions 50 of the transmission member 48, such that the transmission base 42 can drive the elastic component 66 to move synchronously during its upward and downward movement, and then the elastic component 66 can drive the gate plates 56 to move synchronously.

Figure 5:
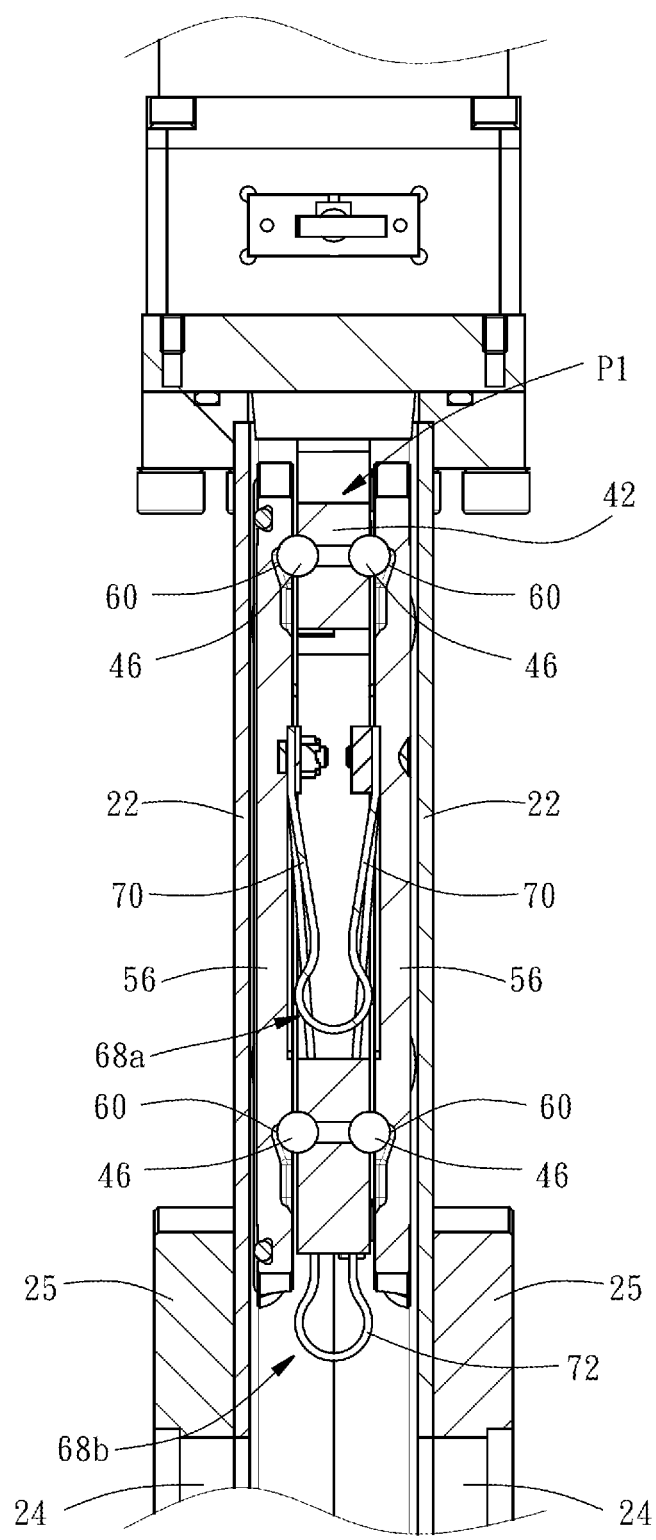
FIG. 5 is a partially sectional lateral view of the gate valve according to the first embodiment of the present invention, showing the balls is located at the first sections of the rolling grooves.

In actual operation, as shown in FIGS. 1 and 4, the transmission base 42 is kept by the driving shaft 34 of the fluid press cylinder 30 in a first position P1 as shown in FIGS. 4 and 5. At this time, the gate plates 56 and the elastic component 66 are received in the chamber 23 for allowing the valve openings 24 to be opened.

Figure 7:
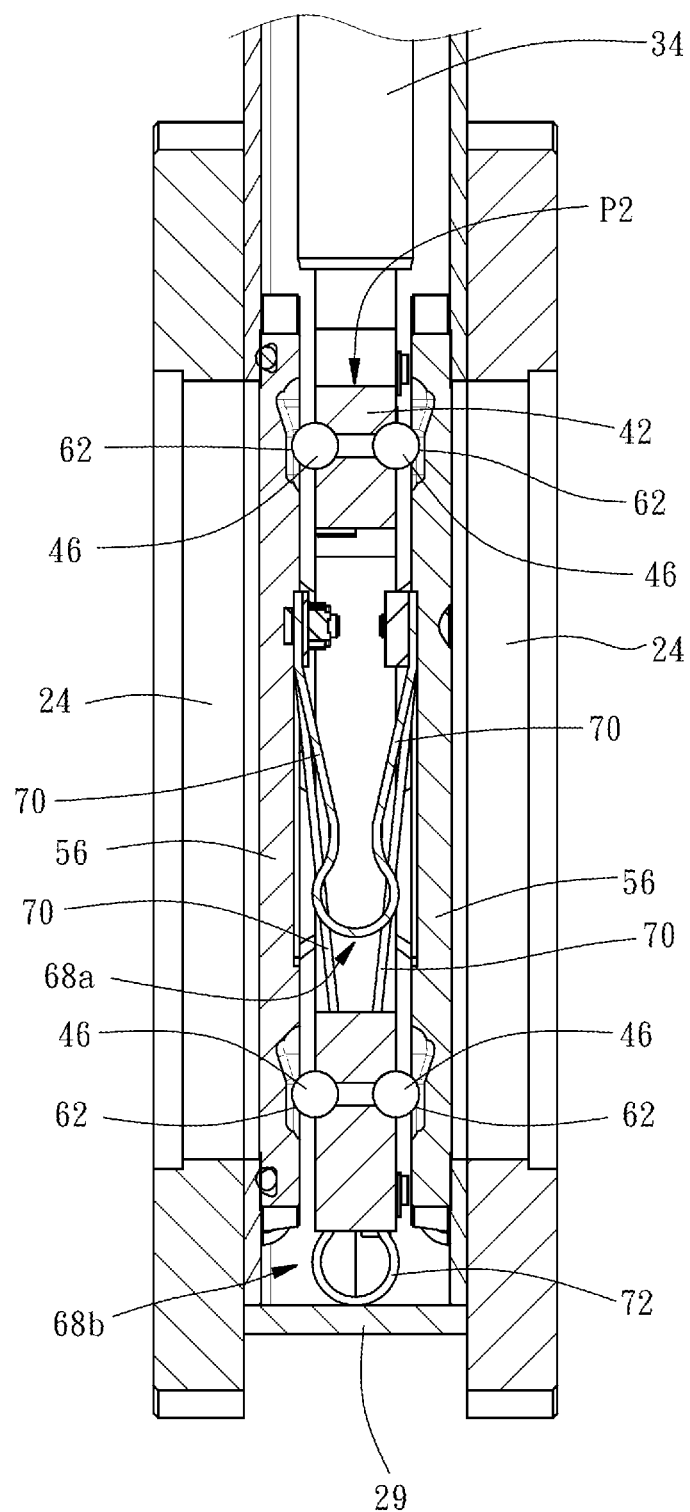
FIG. 7 is a partially sectional lateral view of the gate valve according to the first embodiment of the present invention, showing the balls is located at the second sections of the rolling grooves.

When the transmission base 42 is driven by the driving shaft 34 of the fluid press cylinder 30 to lower from the first position P1 as shown in FIGS. 4 and 5 to a second position P2 as shown in FIGS. 6 and 7. During the lowering of the transmission base 42, the transmission base 42 drives the gate plates 56 to lower synchronously through the elastic component 66. When the elastic positioning portion 72 of the middle elastic member 68b is abutted against the positioning plate 29, a buffer positioning effect is provided to the gate plates 56 for absorbing the impact force exerted by the gate unit 40 on the valve body 20. At this time, the gate plates 56 face the valve openings 24.

Figure 8:
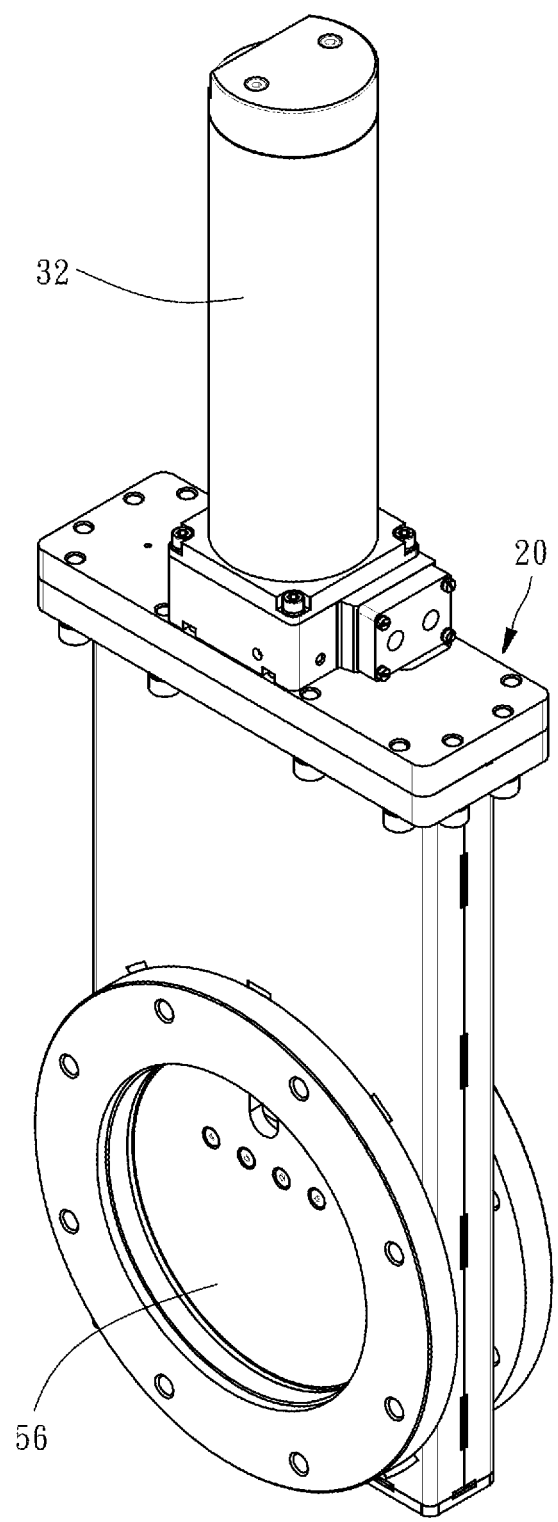
FIG. 8 is a perspective view of the gate valve according to the first embodiment of the present invention, showing the valve openings are closed.

When the gate plates 56 are aimed at the valve openings 24, the transmission base 42 is pushed continuously by the driving shaft 34 of the fluid press cylinder 30, and meanwhile, the balls 46 are moved from the deeper first sections 60 to the shallower second sections 62. When the transmission base 42 reaches to the second position P2 as shown in FIGS. 6 and 7, the balls 46 push the gate plates 56 outwards to increase the distance between the gate plates 56. This causes the valve openings 24 to be sealed by the gate plates 56 (as shown in FIG. 8). At this time, the elastic portions 70 of the elastic members 68a, 68b, 68c are pushed outwards by the gate plates 56 to store the rebound force. On the contrary, when the driving shaft 34 of the fluid press cylinder 30 is moved in a reverse direction, the balls 46 are moved from the shallower second sections 62 to the deeper first sections 60 to release the push force applied to the gate plates 56. By means of the rebound force of the elastic portions 70 of the elastic members 68a, 68b,68c, the gate plates 56 are moved towards each other to decrease the distance between the gate plates 56, thereby eliminating the sealing effect between the gate plates 56 and the valve openings 24. Once the balls 46 are engaged with the first sections 60, the gate plates 56 can be driven by the driving shaft 34 of the fluid press cylinder 30 to move to the first position P1 as shown in FIGS. 4 and 5 for allowing the valve openings 24 to be opened (as shown in FIG. 1).

Figure 9:
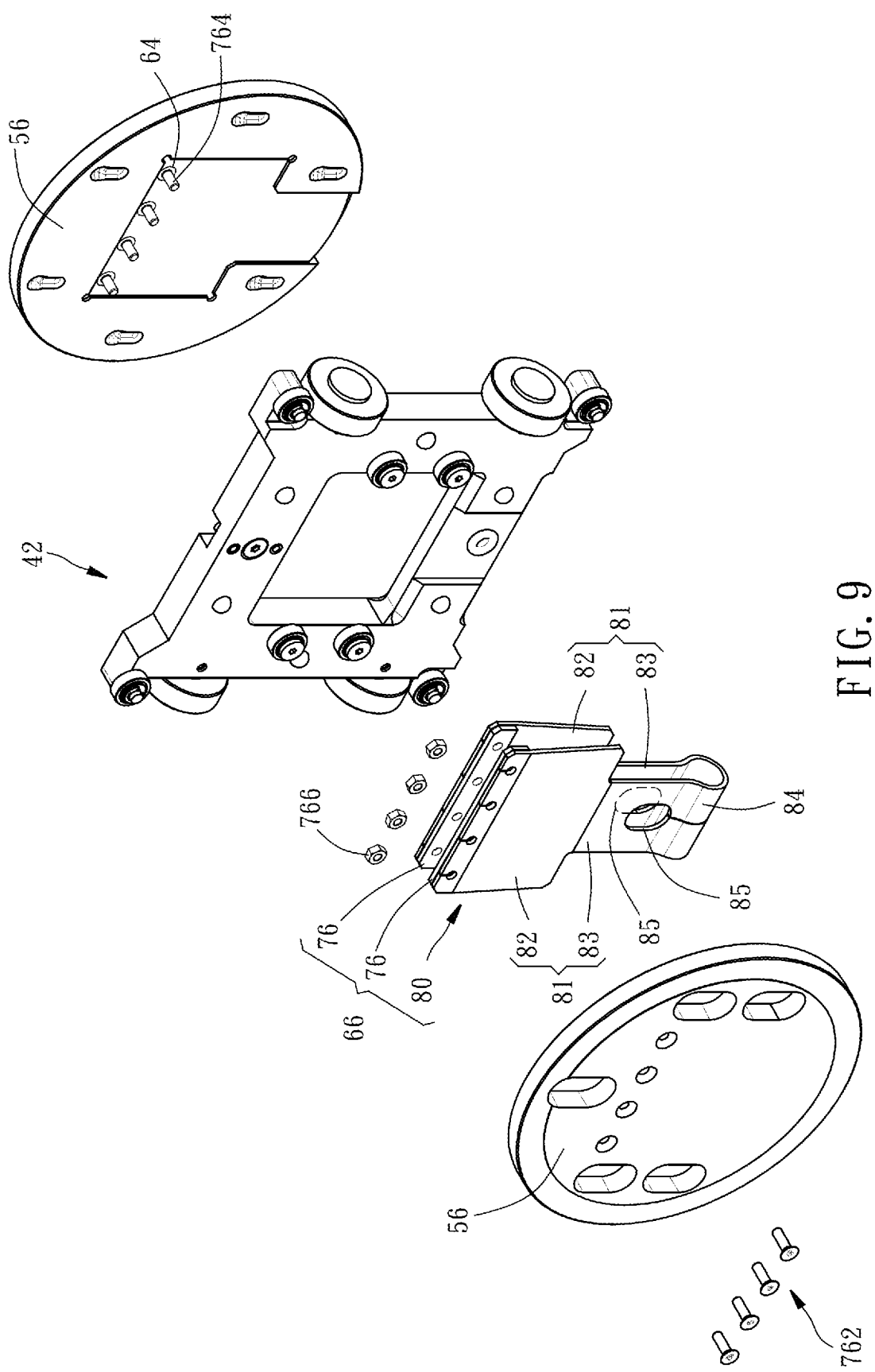
FIG. 9 is an exploded view of the gate unit provided by the gate valve according to a second embodiment of the present invention.
Figure 10:
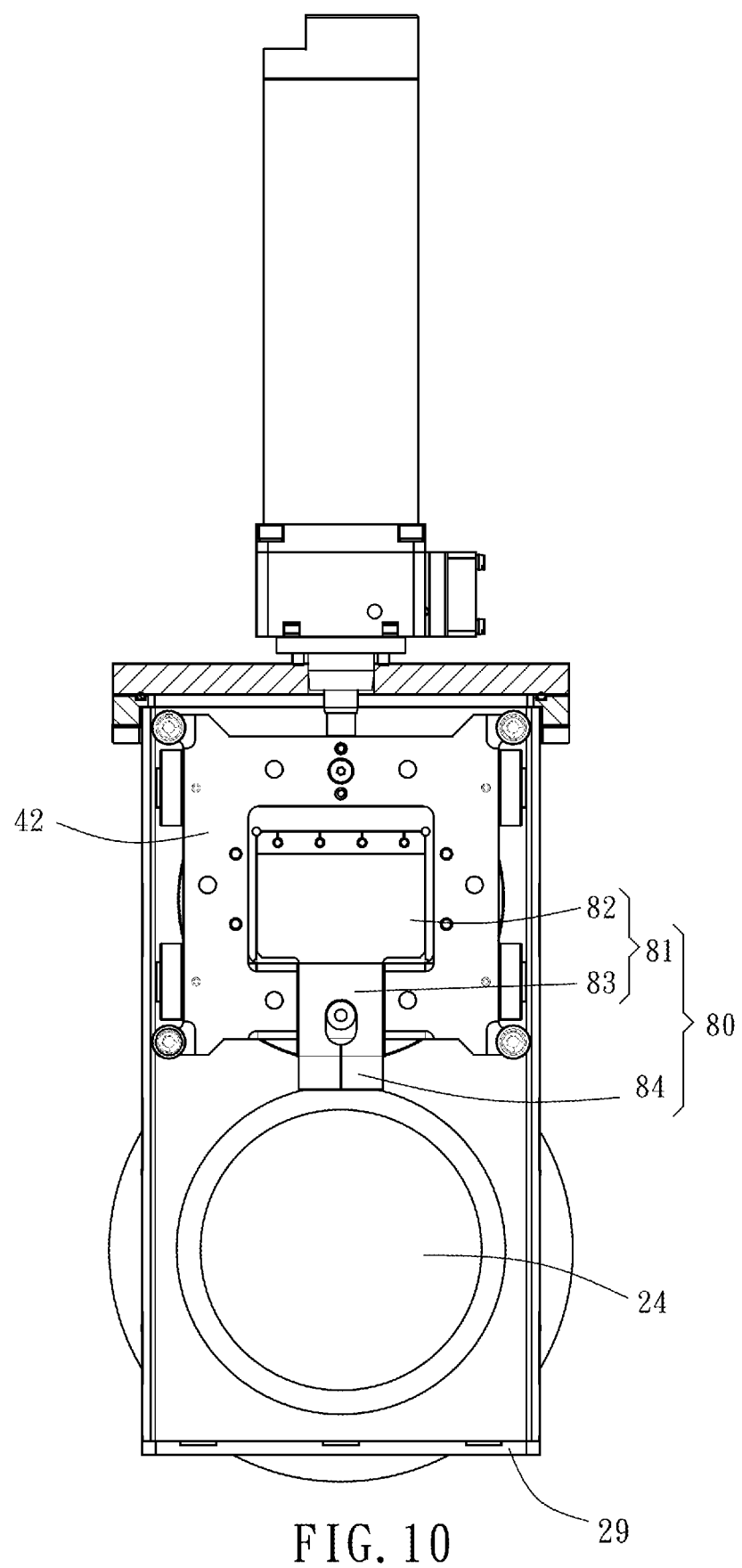
FIG. 10 is a partially sectional front view of the gate valve according to the second embodiment of the present invention, showing the transmission base is located at the first position.

On the other hand, the elastic member can be changeable in structure and number according to actual needs. As shown in FIGS. 9 and 10, in the second embodiment of the present invention, the elastic component 66 has only one elastic member 80. The elastic member 80 has two opposite elastic portions 81 and an elastic positioning portion 84. The elastic portions 81 each have a first arm section 82 and a second arm section 83. The top end of the second arm section 83 is integrally connected with the bottom end of the first arm section 82. The bottom end of the second arm section 83 is integrally connected with the elastic positioning portion 84 and provided with an elongated hole 85 adjacent to the elastic positioning portion 84. Further, the width of the first arm section 82 is greater than the width of the second arm section 83, such that the same elastic portion 81 has different elastic coefficients. As shown in FIGS. 9 and 10, in the second embodiment of the present invention, the elastic component 66 also has two support plates 76. One of the support plates 76 is fastened to the top end of the first arm section 82 of one elastic portion 81 and one of the gate plates 56 by using four screws 762, and the other of the support plates 76 is fastened to the top end of the first arm section 82 of the other elastic portion 81 by using four screws 764 and four nuts 766. The heads of the screws 764 are fixed in four counterbores 64 of the other gate plate 56. By this way, the gate plates 56 are combined together through the elastic component 66, and the elastic component 66 provides the rebound force to the gate plates 56 by using the elastic portions 81 with different elastic coefficients.

A indicated above, the gate valve 10 of the present invention can adjust the number of the elastic members 68a, 68b, 68c according to actual needs (such as different specifications and sizes), and the gate valve 10 of the present invention uses the structural design with different elastic coefficients to adjust the rebound force provided by the elastic members 68a, 68b, 68c. Therefore, the adaptability performance is relatively better. Further, the gate plates 56 provided by the present invention are moved smoothly to improve work efficiency, and because the whole component is relatively simple, the purpose of reducing manufacturing cost can be achieved.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gate valve comprising:

a valve body having a chamber, a positioning plate, and two valve openings communicating with the chamber and located between the chamber and the positioning plate; and a gate unit including a transmission base disposed in the valve body and reciprocally moved between a first position and a second position relative to the valve body, at least one elastic member mounted to the transmission base and having an elastic positioning portion protruding out of the transmission base, and two gate plates disposed at two opposite sides of the transmission base and connected together through the elastic member, such that the gate plates are moved towards each other by an elastic force of the elastic member, wherein when the transmission base is located at the first position, the gate plates and the elastic member are received in the chamber of the valve body for allowing the valve openings of the valve body to be opened, and when the transmission base is located at the second position, the valve openings of the valve body are sealed by the gate plates, and the elastic positioning portion of the elastic member is abutted against the positioning plate of the valve body, wherein the gate unit includes one of said elastic member with two opposite elastic portions; one end of each of the elastic portions is connected with one of the gate plates, and the other end of each of the elastic portions are connected with the elastic positioning portion, and wherein the elastic portions each have a first arm section and a second arm section connected with the first arm section; one ends of the first arm sections are connected with the gate plates, and two ends of the second arm sections are connected with the first arm sections and the elastic positioning portion respectively; widths of the first arm sections are greater than widths of the second arm sections.

2. The gate valve as claimed in claim 1, wherein two opposite sides of the transmission base each have a transmission protrusion, and the second arm section of each of the elastic portions of the elastic member has an elongated hole adjacent to the elastic positioning portion; the elongated holes of the elastic member are slidably sleeved on the transmission protrusions of the transmission base.

3. The gate valve as claimed in claim 1, further comprising a fluid pressure cylinder disposed in the valve body and having a driving shaft passing through the chamber and connected with the transmission base.

4. A gate valve comprising:

a valve body having a chamber, a positioning plate, and two valve openings communicating with the chamber and located between the chamber and the positioning plate; and a gate unit including a transmission base disposed in the valve body and reciprocally moved between a first position and a second position relative to the valve body, at least one elastic member mounted to the transmission base and having an elastic positioning portion protruding out of the transmission base, and two gate plates disposed at two opposite sides of the transmission base and connected together through the elastic member, such that the gate plates are moved towards each other by an elastic force of the elastic member, wherein when the transmission base is located at the first position, the gate plates and the elastic member are received in the chamber of the valve body for allowing the valve openings of the valve body to be opened, and when the transmission base is located at the second position, the valve openings of the valve body are sealed by the gate plates, and the elastic positioning portion of the elastic member is abutted against the positioning plate of the valve body, wherein the gate unit includes at least two of said elastic members each having two opposite elastic portions; one ends of the elastic portions of each of the elastic members are connected with the gate plates and the other ends of the elastic portions of each of the elastic members are connected with the elastic positioning portion; lengths of the elastic portions of one elastic member are greater than lengths of the elastic portions of the other elastic member.

5. The gate valve as claimed in claim 4, wherein two opposite sides of the transmission base each have a transmission protrusion, and the elastic portions of one of the elastic members each have an elongated hole adjacent to the elastic positioning portion; the elongated holes of the elastic members are slidably sleeved on the transmission protrusions of the transmission base.

6. A gate valve comprising:

a valve body having a chamber, a positioning plate, and two valve openings communicating with the chamber and located between the chamber and the positioning plate; and a gate unit including a transmission base disposed in the valve body and reciprocally moved between a first position and a second position relative to the valve body, at least one elastic member mounted to the transmission base and having an elastic positioning portion protruding out of the transmission base, and two gate plates disposed at two opposite sides of the transmission base and connected together through the elastic member, such that the gate plates are moved towards each other by an elastic force of the elastic member, wherein when the transmission base is located at the first position, the gate plates and the elastic member are received in the chamber of the valve body for allowing the valve openings of the valve body to be opened, and when the transmission base is located at the second position, the valve openings of the valve body are sealed by the gate plates, and the elastic positioning portion of the elastic member is abutted against the positioning plate of the valve body, wherein the gate unit further includes two balls disposed at two opposite sides of the transmission base; each of the gate plates has a rolling groove at one side towards the transmission base; the rolling grooves each have a first section and a second section connected with the first section; a depth of the first section is greater than a depth of the second section; when the transmission base is located at the first position, the balls are located at the first sections of the rolling grooves, and when the transmission base is located at the second position, the balls are located at the second sections of the rolling grooves and push the gate plates outwards to seal the valve openings.

* * * * *